United States Patent [19]
Hida et al.

[11] Patent Number: 5,936,695
[45] Date of Patent: Aug. 10, 1999

[54] LIQUID CRYSTAL DISPLAY DEVICE AND METHOD OF FABRICATING SAME

[75] Inventors: Yoshito Hida; Kouki Kimura, both of Tokyo, Japan

[73] Assignee: Kabushiki Kaisha Toshiba, Kawasaki, Japan

[21] Appl. No.: 08/825,531

[22] Filed: Mar. 28, 1997

[30] Foreign Application Priority Data

Mar. 29, 1996 [JP] Japan .................................. 8-075616

[51] Int. Cl.⁶ .................................................. G02F 1/335
[52] U.S. Cl. ...................... 349/153; 349/154; 349/189; 349/190; 349/158
[58] Field of Search ................................. 349/153, 154, 349/189, 190, 158

[56] References Cited

U.S. PATENT DOCUMENTS 5,771,085  6/1998  Ochi et al. ............................ 349/158
5,854,664  12/1998  Inoue et al. ............................ 349/92

*Primary Examiner*—Robert H. Kim
*Assistant Examiner*—Andrew H. Lee
*Attorney, Agent, or Firm*—Pillsbury Madison & Sutro LLP

[57] ABSTRACT

There is disclosed a liquid crystal display device comprising two substrates that can be taken out of large-sized substrate boards at an improved efficiency of utilization. After the two substrates are bonded together, it is not necessary to remove unwanted peripheral portions by scribing. Alignment marks are formed on the substrates to assist alignment of both substrates. Two holes are formed in a layer of a sealant material such that these holes are located in the top and bottom walls of the completed display. A liquid crystal material is injected through these holes when both substrates are bonded together.

11 Claims, 14 Drawing Sheets

LIQUID CRYSTAL DISPLAY DEVICE AND METHOD OF FABRICATING SAME

BACKGROUND OF THE INVENTION

1. Field of the Invention

The present invention relates to a liquid crystal display device where a liquid crystal material is held between a pair of substrates. The invention relates also to a method of fabricating such a liquid crystal display device.

2. Description of the Related Art

In recent years, liquid crystal display devices have been used as display devices for use in personal computers, word processors, TV receivers, and so on by making use of their merits (i.e., they are thin, lightweight, and low power consumption). Also, they find extensive use as projection type displays.

Among them, active matrix liquid crystal display devices where switching devices are electrically connected with each of pixel electrodes have been earnestly researched and developed because good display images can be accomplished without crosstalk between adjacent pixels.

As an example, the structure of an active matrix liquid crystal display device of the transmissive type is next described briefly. In the active matrix liquid crystal display device, a liquid crystal material is sandwiched between an array substrate and a counter substrate via orientation films.

The array substrate comprises a glass substrate on which signal lines and scanning lines are arranged in rows and columns. Thin-film transistors (TFTs) are disposed as switching devices near the intersections of the signal and scanning lines. Pixel electrodes of ITO (indium tin oxide) and the signal lines are connected via the TFTs. Storage capacitor lines run substantially parallel to the scanning lines on the glass substrate. A dielectric film is interposed to form storage capacitor (Cs) between the adjacent storage capacitor lines and pixel electrodes.

The counter substrate comprises a glass substrate on which a matrix-like light-shielding film are formed. The light-shielding film shields the light through the area between the pixel electrodes and the signal and scannning lines, and shields the light towards the TFTs. The counter electrodes of ITO are deposited over the light-shielding film.

The manner in which the array substrate and counter substrate are aligned to each other and assembled into a liquid crystal display device by the prior art techniques is now described by referring to FIGS. 12–14. One conventional method is first described by referring to FIGS. 12 and 13. The array substrate and counter substrate, indicated by 1100 and 1300, respectively, are sawn from their larger original substrate. This kind of sawing operation is so carried out that an extra peripheral region 1800 is given to the surroundings of the final contour of each substrate. Alignment marks 1271, 1273 and 1371, 1373 have been previously put on the peripheral regions 1800 of the substrates 1100 and 1300, respectively. On each substrate sawn apart, the alignment marks 1271, 1273 or 1371, 1373 are normally located at diagonally opposite corners. When both substrates 1100 and 1300 are bonded together, the alignment marks are aligned, using cameras (1701, 1072) or like that. After the bonding, the peripheral regions 1800 of the substrates 1100 and 1300 are scribed and removed.

Another conventional method is next described by referring to FIG. 14. A counter substrate 1300 has outer dimensions sufficiently larger than its final outer dimensions. The counter substrate 1300 has two alignment marks 1271 and 1273 in its peripheral region 1800 that is located outside the final contour. An array substrate 1100 is cut into its final contour. After the counter substrate 1300 and the array substrate 1100 are bonded together via a sealant material, the unwanted peripheral region of the counter substrate is scribed and removed before or after injection of a liquid crystal material.

Since the array substrate 1100 includes a connector region 1295 around its display region 1290 to permit electrical connections with an external circuit, the array substrate 1100 are sufficiently larger in outer dimensions than the display region 1290. Therefore, sufficient degrees of freedom are given in placing the alignment marks 1371 and 1373 outside the display region of the array substrate 1100, the marks being used for alignment with the counter substrate 1300.

On the other hand, the counter substrate 1300 makes little difference in outer dimensions with the display region 1290 and, therefore, it is difficult to place outside the display region 1291 the marks 1371 and 1373 for alignment with the array substrate 1100.

With the prior art techniques, it is difficult to take plural counter substrates from a large-sized original substrate. Consequently, much material loss results and thus it is difficult to improve the productivity.

SUMMARY OF THE INVENTION

In view of the foregoing problems with the prior art techniques, the present invention has been made.

It is an object of the present invention to provide liquid crystal display devices that can be fabricated with excellent efficiency and high yield.

It is another object of the invention to provide a method of fabricating liquid crystal display devices with excellent efficiency and high yield.

A liquid crystal display device set forth in claim 1 comprises a first substrate, a second substrate disposed opposite to the first substrate, a liquid crystal material held in a gap created between the first and second substrates, a layer of a sealing member placed in the gap and provided with one or more opening regions for injecting the liquid crystal material. A plurality of display electrodes are disposed on the first substrate to form a display region. The sealing member surrounds the display region excluding the opening regions. On each of the first and second substrates, alignment marks for aligning these two substrates with each other are disposed in the opening regions.

In this structure, the alignment marks are arranged in the opening regions for injecting the liquid crystal material, as mentioned above, to align the two substrates with each other. The provision of the alignment marks in the opening regions reduces the area of the regions of the substrates that are not necessary for the final product. Accordingly, substrates having outer dimensions approaching the final outer dimensions can be treated. Therefore, where a plurality of substrates are taken from a large-sized original substrate, it can be utilized with an improved efficiency. In consequence, an excellent productivity can be secured. Furthermore, it is possible to alleviate the burden imposed on the step for scribing and removing the unwanted peripheral portions after the bonding of the substrates. Thus, a deterioration of the production yield due to poor scribing can be suppressed.

A liquid crystal display device set forth in claim 2 is based on the structure described in the preceding paragraph and further characterized in that said one or more opening regions having the alignment marks are at least two in number. This eliminates the need to form other alignment marks. Consequently, it is not necessary to form such regions on the substrates which are unnecessary for the final product.

A liquid crystal display device set forth in claim 3 is based on the structure described above and further characterized in that said one or more opening regions having the alignment marks are at least two holes formed at one edge of the liquid crystal display device. This facilitates injecting the liquid crystal display device from this one edge after vacuum pumping.

A liquid crystal display device set forth in claim 4 is based on the structure described above and further characterized in that said one or more opening regions having the alignment marks are formed at two opposite edges of the liquid crystal, at least one opening region at each edge. The distance between the two opening regions having the alignment marks can be made large. This renders the alignment operation easy. One opening region can be used as a vacuum-pumping hole for evacuation. This can accelerate injection of the liquid crystal material through the other opening region.

A liquid crystal display device set forth in claim 5 is based on the structure described above and further characterized in that said one or more opening regions having the alignment marks are formed at two diagonally opposite corners of the liquid crystal display device.

A method of fabricating a liquid crystal display device as set forth in claim 6 comprises the steps of: preparing a first substrate including a first substrate upon which a multiplicity of display electrodes are formed to constitute a display region; preparing a second substrate; disposing a sealing member on said first or second substrate so as to surround said display region while forming one or more opening regions for injecting a liquid crystal material; aligning and bonding said first and second substrates to each other via said sealing member; and injecting said liquid crystal material into said gap through said opening regions. Said step of aligning said first and second substrates to each other is carried out, using alignment marks disposed in said opening regions formed on said first and second substrates.

A method set forth in claim 7 is based on the method of claim 6 and further characterized as follows. Said sealing member is so positioned that said opening regions having said alignment marks are formed at two opposite edges of said liquid crystal display device, at least one opening region at each edge. After the substrates are aligned and bonded to each other and the sealing member is cured, said liquid crystal material is injected through one of the opening regions while evacuating air through the other. In this method, both substrates can be readily aligned to each other. Also, the liquid crystal material can be easily injected.

A method set forth in claim 8 is based on the method of claim 6 and further characterized in that said alignment marks and scanning lines on said first substrate are formed from the same thin metal film by the same processing step. The formation of the alignment marks on the first substrate needs no additional processing step.

A method set forth in claim 9 is based on the method of claim 6 and further characterized in that said alignment marks and a light-shielding film on said second substrate are formed from the same material by the same processing step. The formation of the alignment marks on the second substrate needs no additional processing step.

A method set forth in claim 10 is based on the method of claim 6 and further characterized in that said alignment marks and colored portions on said second substrate are formed from the same material by the same processing step.

A method set forth in claim 11 is based on the method of claim 6 and further characterized in that said alignment marks and a counter electrode on said second substrate are formed from the same material by the same processing step or that said alignment marks on said first substrate and said display electrodes are formed from the same transparent material by the same processing step. The second sealant material can be completely sealed only by illuminating it with light or ultraviolet radiation.

Other objects and features of the invention will appear in the course of the description thereof, which follows.

DESCRIPTION OF THE PREFERRED EMBODIMENTS

Figure 1:
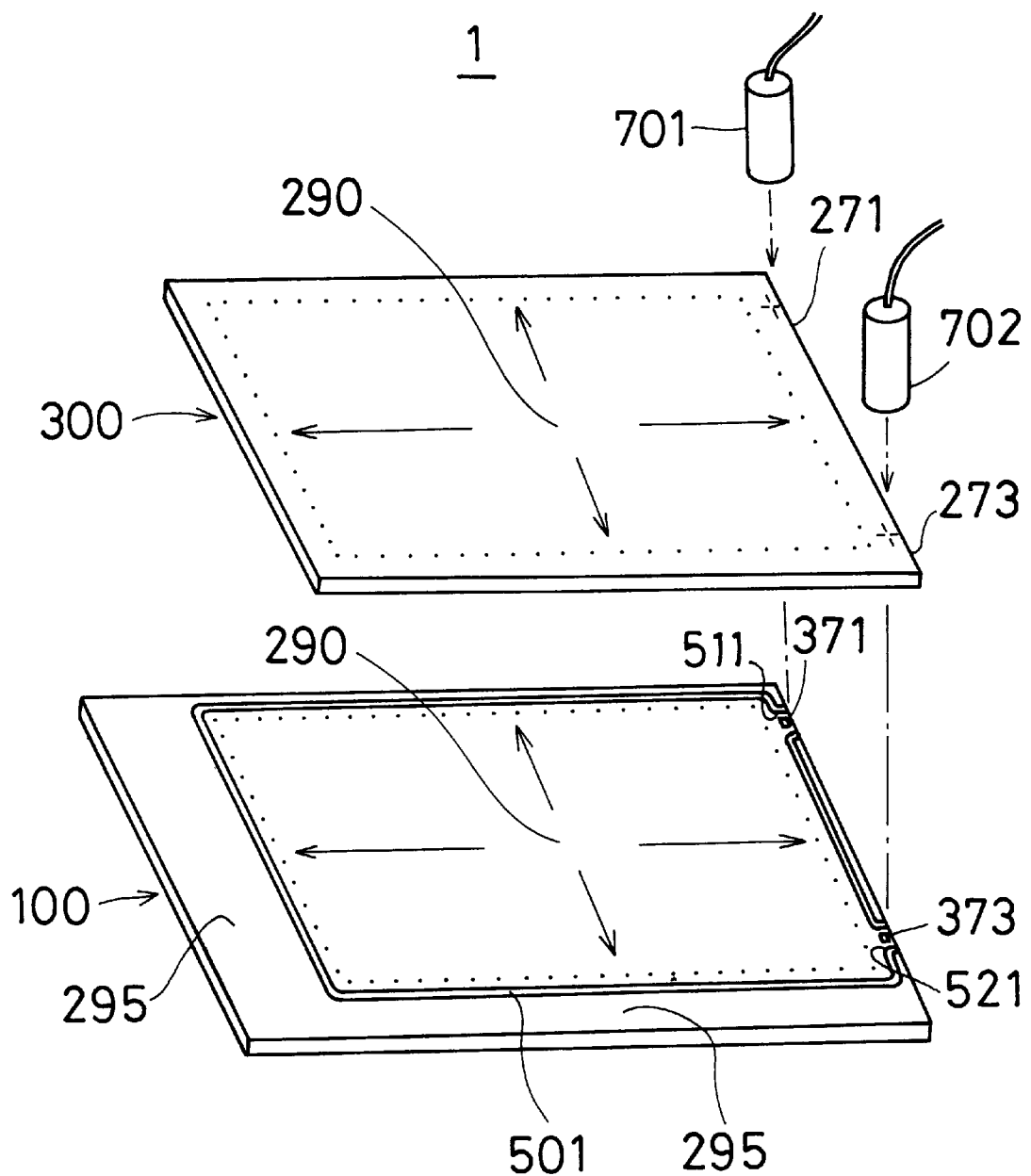
FIG. 1 is a schematic perspective view of an active matrix liquid crystal display device in accordance with the present invention, illustrating the manner in which substrates are aligned to each other.

An active matrix liquid crystal display device embodying the concept of the present invention and alignment of its array substrate and counter substrate are next described in detail by referring to FIGS. 1–6. As schematically shown in FIG. 1, this active matrix liquid crystal display device, generally indicated by reference numeral 1, comprises the array substrate, 100, having a display region 290 and the counter substrate, 300. Since it is necessary to dispose around the display region 290 a shelflike connector region 295 for connection with an external circuit, the array substrate 100 has outer dimensions sufficiently larger than those of the display region 290. The counter substrate 300 approximate in outer dimensions to the display region 290 of the array substrate 100.

Figure 2:
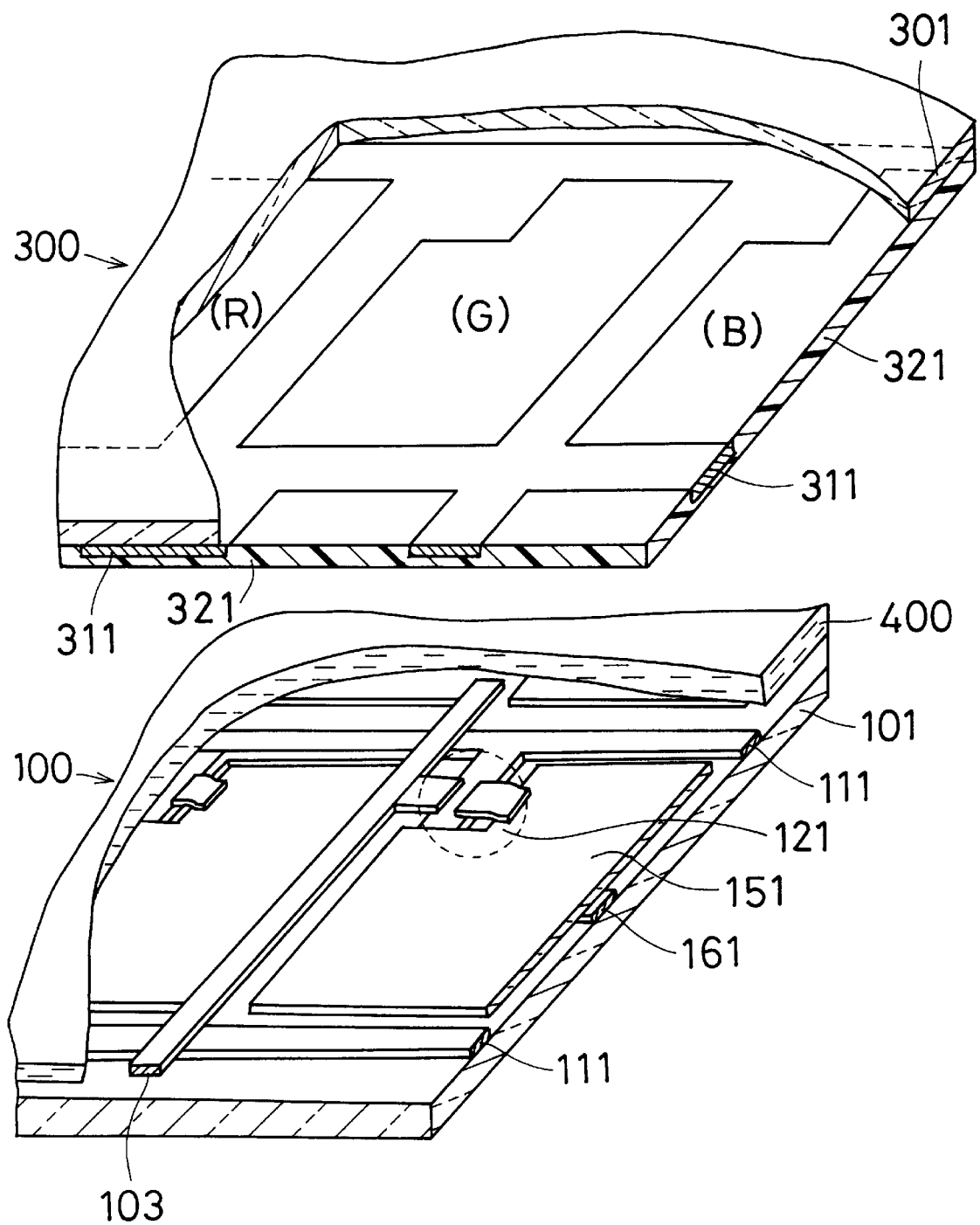
FIG. 2 is a schematic fragmentary exploded perspective view of the display region of the liquid crystal display device shown in FIG. 1, and in which a dielectric film and a semiconductor film have been omitted.
Figure 3:
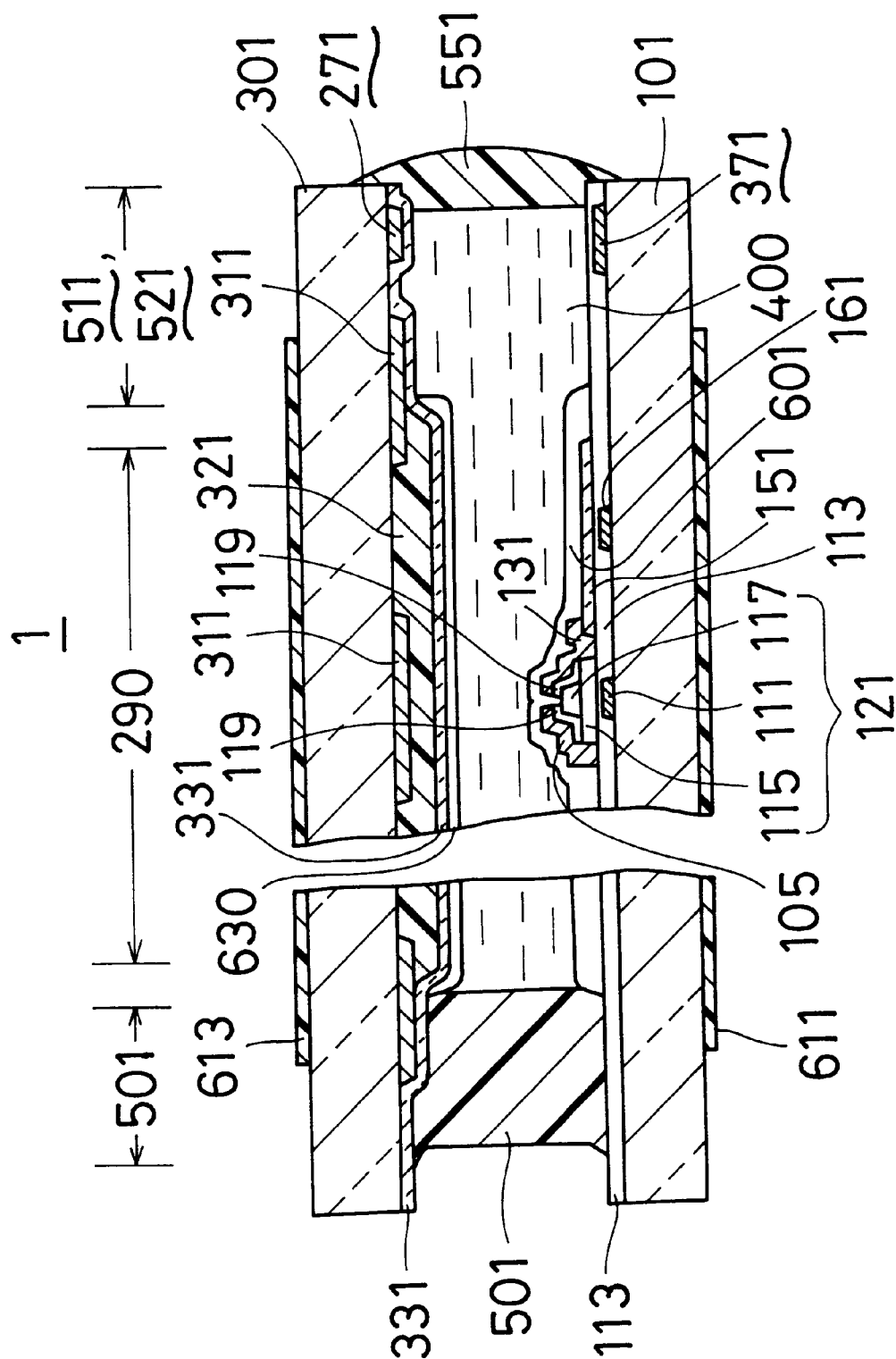
FIG. 3 is a schematic vertical cross section of a multilayer functional film included in the liquid crystal display device shown in FIG. 1.

As shown in FIGS. 2 and 3, the display region 290 of the array substrate 100 comprises a glass substrate 101 on which 640×3 signal lines 103 intersect 480 scanning lines 111 substantially at right angles. As shown in FIG. 1, the shelflike connector region 295 protrudes outwardly from the portion of the array substrate 100 that overlaps the counter substrate 300. Pixel electrodes 151 are disposed via TFTs 121 around the intersections of the signal lines 103 and scanning lines, thus forming the display region 290.

With respect to each TFT 121, a gate electrode 111 is brought out from the corresponding scanning line, and a dielectric film 113 consisting of a lamination film of silicon oxide and silicon nitride is deposited on the gate electrode 111. An a-Si:H film is deposited as a semiconductor film 115 on the dielectric film 113. Silicon nitride that is a channel-protecting film 117 is deposited on the semiconductor film 115 and self-aligned to the gate electrode 111. This semiconductor film 115 is electrically connected with pixel electrodes 151 via a low-resistivity semiconductor film 119 and via their respective source electrodes 131. The low-resistivity semiconductor film 119 is made from an n$^+$-type a-Si:H film. The semiconductor film 115 is also electrically connected with the signal lines 103 via the low-resistivity semiconductor film 119 and via their respective drain electrodes 105 extending from the signal lines 103. Storage capacitor lines 161 extend substantially parallel to the scanning lines and overlap with the pixel electrodes 151. The pixel electrodes 151 and the storage capacitor lines 161 cooperate to form storage capacitors Cs.

The counter substrate 300 comprises a transparent glass substrate 301 on which a light-shielding film 311 consisting of a lamination film of chromium oxide and metal chromium is deposited. This light-shielding film 311 has a matrix construction and acts to shield the light towards the TFTs 121, and light from the gaps between the signal lines 103 and pixel electrodes 151, and the gaps between the scanning lines and pixel electrodes 151. Colored portions 321 (321-R, 321-G, and 321-B) consisting of the three primary colors (i.e., red, green, and blue), respectively, are formed in each area surrounded by matrix-line of the light-shielding film 311 to provide a color display. A counter electrode 331 made of ITO is formed on the light-shielding film 331.

As schematically shown in the vertical cross section of FIG. 3, polarizing sheets 611 and 613 are stuck to the outer surfaces of the array substrate 100 and counter substrate 300, respectively. These array substrate 100 and counter substrate 300 are disposed opposite to each other via a layer of a sealant material 501 that surrounds the display region 290. A gap of 5 microns is maintained between these two substrates. A layer of a twisted nematic liquid crystal material 400 is held between the array substrate 100 and the counter substrate 300 via orientation films 601 and 603, respectively.

As shown in FIG. 1, this sealant material 501 is provided with two liquid crystal injection holes 511 and 521 at one edge of the liquid crystal display device 1. These holes 511 and 521 are spaced from each other along this one edge. The liquid crystal material 400 is injected through these injection holes 511 and 521. As shown in the enlarged plan view of FIG. 4, the injection holes 511 and 521 are closed off by end-sealing materials 551 and 553 (not shown in FIG. 1), respectively.

Figure 5:
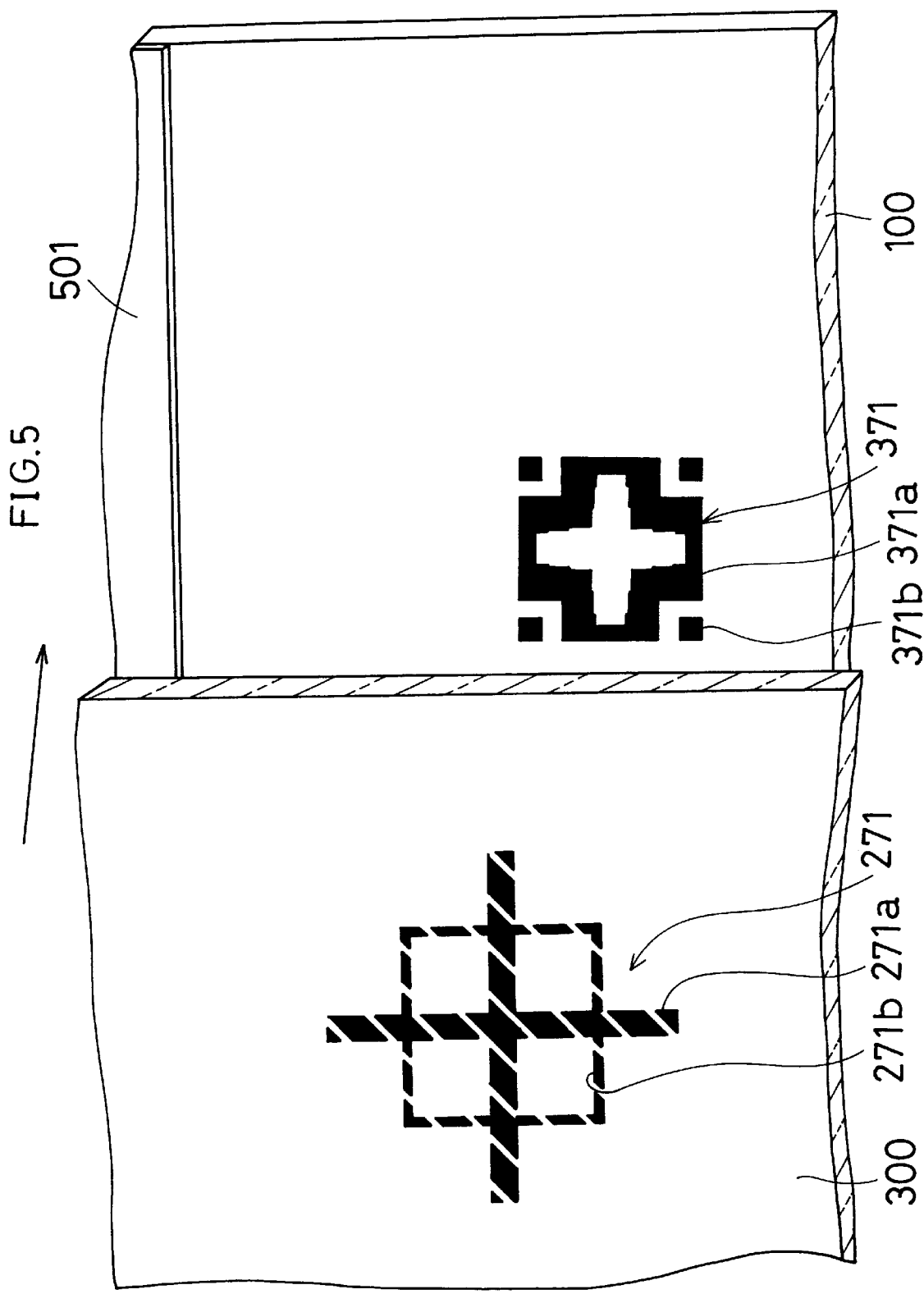
FIG. 5 is a schematic perspective view of a array substrate and a counter substrate, showing the shapes of alignment marks on the substrates as well as an alignment operation.

In this embodiment of liquid crystal display device 1, alignment marks 371, 373 and 271, 273 are arranged on the array substrate 100 and counter substrate 300, respectively, and located at the injection holes 511 and 521, respectively, as shown in FIG. 1, to align these two substrates with each other. The alignment marks 371 and 373 arranged on the array substrate 100 are created by forming a film and patterning it simultaneously with the formation of the scanning lines and gate electrodes 111. As shown in FIG. 5, each mark has a central crisscross blank portion. The alignment marks 271 and 273 disposed on the counter substrate 300 are virtually crisscross marks, as shown in FIG. 5. These alignment marks 271 and 273 are formed by depositing a film and patterning it simultaneously with the formation of the light-shielding film 311.

The alignment marks 371 and 373 on the array substrate 100 are formed simultaneously with the scanning lines to circumvent an increase in the number of processing steps. Furthermore, since the patterning to create the scanning lines provides a basis for other patterning operations, the alignment operation can be performed with a small amount of error. However, if the signal lines 103 form a basis for the patterning operations, the alignment marks 371, 373 may also be formed concurrently with the signal lines 103.

In this embodiment, the alignment marks 271 and 273 on the counter substrate 300 are formed simultaneously with the light-shielding film 311 to avoid an increase of the number of processing steps again. Furthermore, the marks may be formed simultaneously with the colored portions 321. The counter electrode 331 consisting of ITO covers the alignment marks 271 and 273 of the counter substrate 300 and the injection holes 551 and 553. This prevents unwanted impurities from entering the glass substrate 301 and the alignment marks such as 271 and 273 when the liquid crystal material 400 is injected. These two sets of alignment marks 271, 273, 371, and 373 are aligned to each other, as shown in FIGS. 5 and 6, to align the array substrate 100 and counter substrate 300 to each other.

The shapes of the alignment marks 271, 273, 371, and 373 are particularly shown in FIG. 5. The alignment mark 271 on the counter substrate comprises a crisscross portion 271a and a square portion 271b overlapping with the crisscross portion 271a. This crisscross portion 271a consists of two wide line segments of the same length. The square portion 271b consists of line segments that are narrower and shorter than the line segments forming the crisscross portion 271a. The alignment mark 273 is similar in configuration to this alignment mark 271. On the other hand, the alignment mark 371 on the array substrate comprises a wide blank crisscross portion 371a and four square solid portions 371b located between the successive arms of the crisscross portion 371a so as to define the four corners of an imaginary square. The alignment mark 373 is constructed similarly.

Referring to FIGS. 1 and 5, before both substrates 100 and 300 are bonded together, the relative position between both substrates 100 and 300 is adjusted while monitoring the two sets of alignment marks 271, 273, 371, 373 and their surroundings from above by two cameras 701 and 702. It is determined that when these two alignment marks 271, 273, 371, 373 overlap best, the alignment has been completed.

Figure 6:
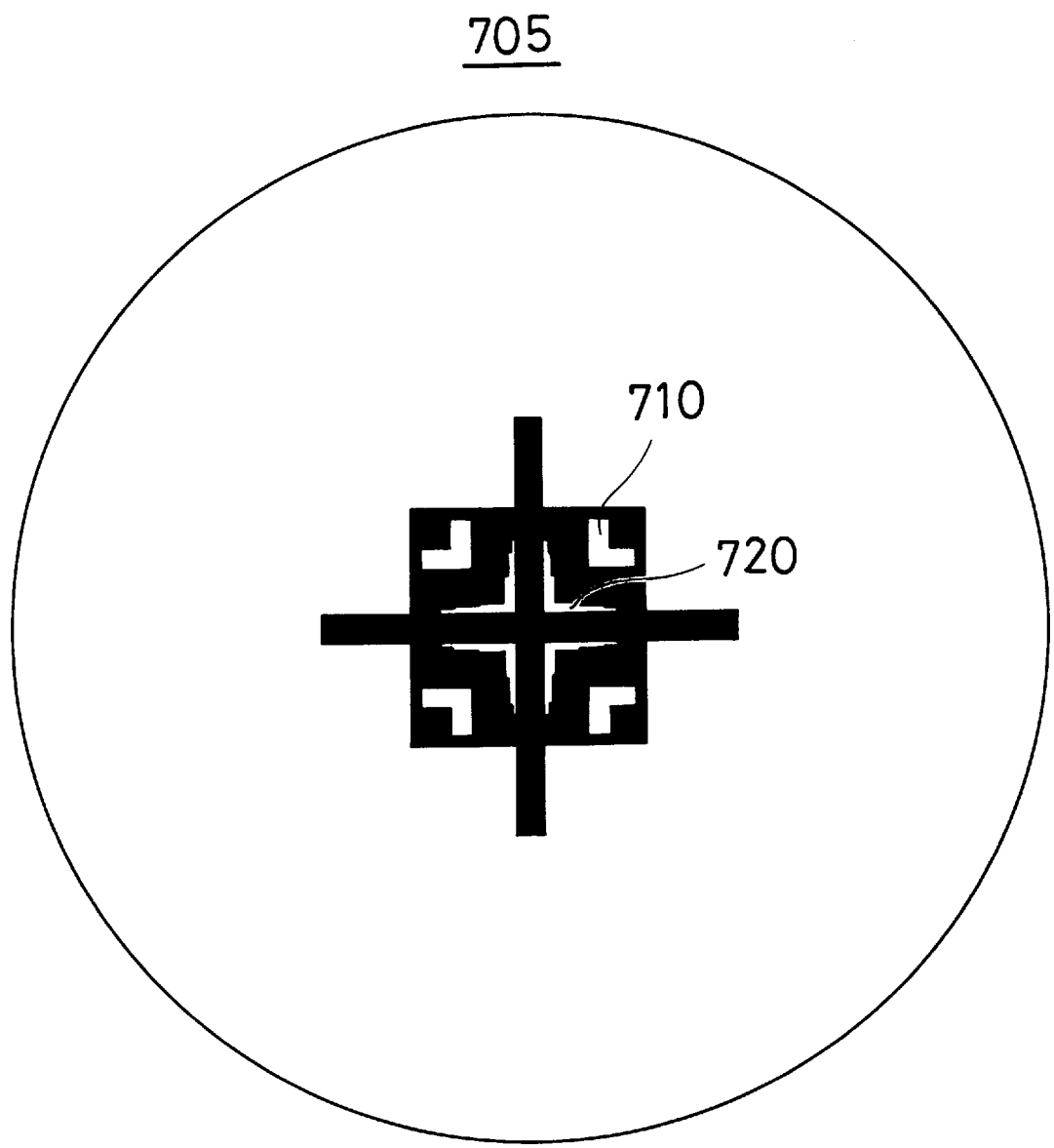
FIG. 6 is a representation of an image obtained when a pair of alignment marks shown in FIG. 1 coincide in position within the field of view of a camera.

FIG. 6 indicates a state in which the alignment mark 371 on the array substrate is completely aligned with the alignment mark 271 on the counter substrate within the camera's image. For the alignment, four bold L-shaped portions such as 710 surrounded by the wide blank crisscross portion 371a, solid portions 371b, and square portion 271b are first compared in terms of shape. Thus, direction and degree of misalignment between the alignment marks 271 and 371 can be easily judged. Therefore, the alignment can be carried out quickly. Furthermore, since each arm of the blank crisscross portion 371a decreases in a stepwise fashion outwardly, a final accurate alignment can be accomplished by observing the gaps 720 between the blank crisscross portion 371a and the crisscross portion 271a.

After both substrates 100 and 300 have been aligned, they are pressed against each other so that they are bonded together. Then, the sealant material 501 is completely cured by heating. In this way, an empty cell is obtained, and this cell is fully evacuated by vacuum pumping. The side having the injection holes 511 and 521 is immersed in a liquid crystal material while maintaining the low pressure. Then, the assembly is returned to an atmospheric ambient. After some time, the injection of the liquid crystal material is completed. Thereafter, end-sealing materials 551 and 552 are injected to seal the injection holes 511 and 521 and illuminated with ultraviolet radiation to cure them.

Figure 4:
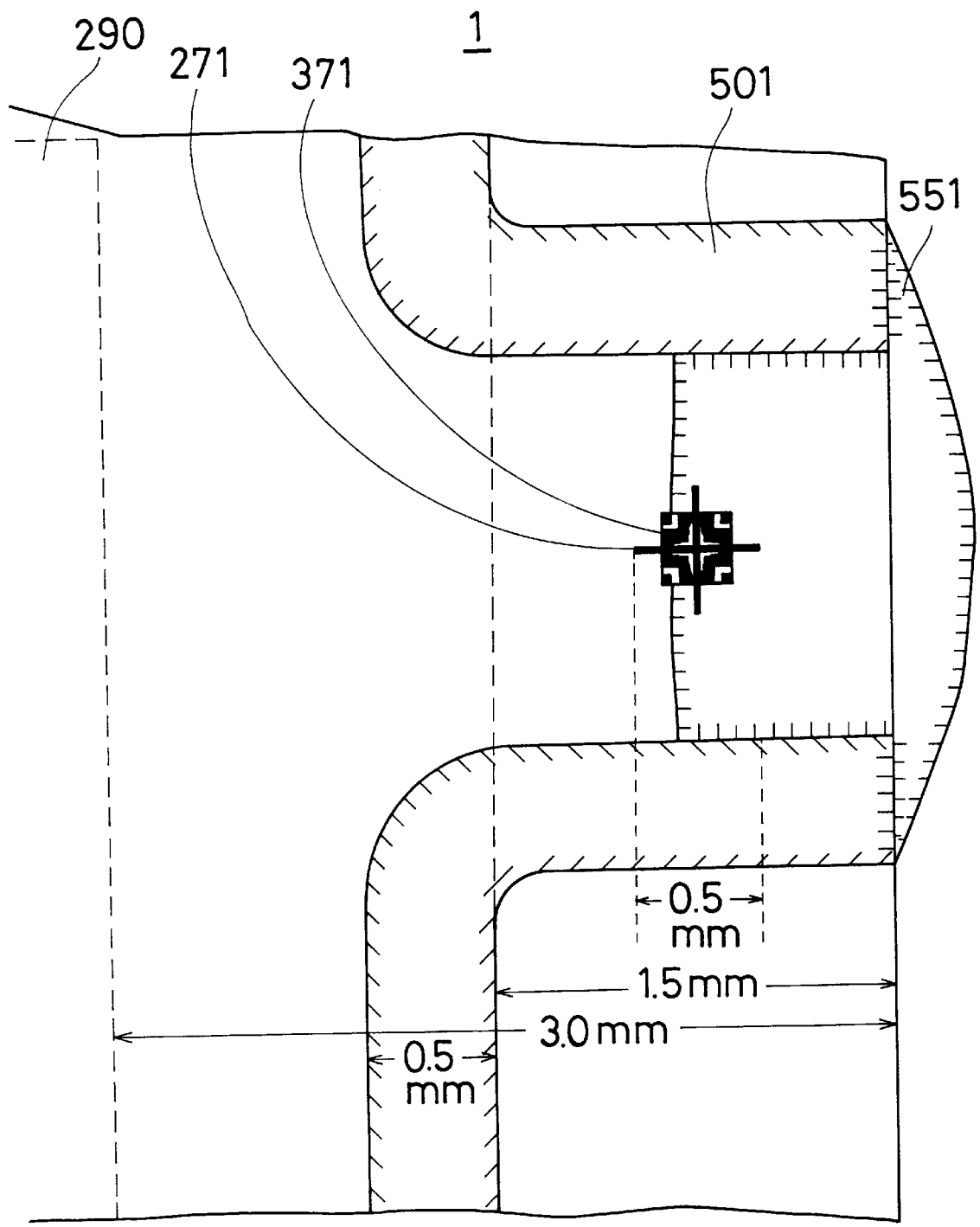
FIG. 4 is a fragmentary enlarged plan view of one of liquid crystal injection holes formed in the liquid crystal display device shown in FIG. 1, and in which an alignment mark is formed in the hole.

FIG. 4 is a top plan view of the injection hole 511 and its surroundings after the sealant material 551 has been injected. Various dimensions are put on this figure. As can be seen from this illustrative embodiment, the end-sealing material 551 for closing off the injection holes often overlaps with the alignment marks 271 and 371. For example, where ultraviolet radiation is emitted from the surface of the array substrate, that portion of the sealant material 551 which is shielded by the alignment mark 271 on the array substrate does not undergo UV irradiation. However, this shielded portion is small in area and width. Even UV curable resins gradually harden at or above ordinary temperatures. Therefore, a UV curable resin that is completely cured by appropriate heating can be selected.

As thus far described, in this embodiment of liquid crystal display device 1, the alignment marks 371, 373 are located on the array substrate 100 at the two liquid crystal injection holes 511 and 553, respectively. Also, the alignment marks 271 and 273 are located on the counter substrate 300 at the edges of the two liquid crystal injection holes 511 and 521. The two substrates are aligned to each other, using these marks.

Therefore, when the counter substrate 300 and array substrate 100 are bonded together via the sealant material 501, a substrate having final outer dimensions close to those of the display region 290 can be used as the counter substrate 300. Hence, a number of counter substrates such as the substrate 300 can be taken from a large-sized glass substrate. Consequently, material loss can be suppressed. Furthermore, the productivity can be enhanced.

Additionally, after bonding together the array substrate 100 and counter substrate 300, it is not necessary to scribe and remove the unwanted peripheral portion of the counter substrate 300; otherwise the array substrate 100 would be scratched or scribed at undesired locations during the scribing. As a result, the production yield can be improved greatly.

Figure 7:
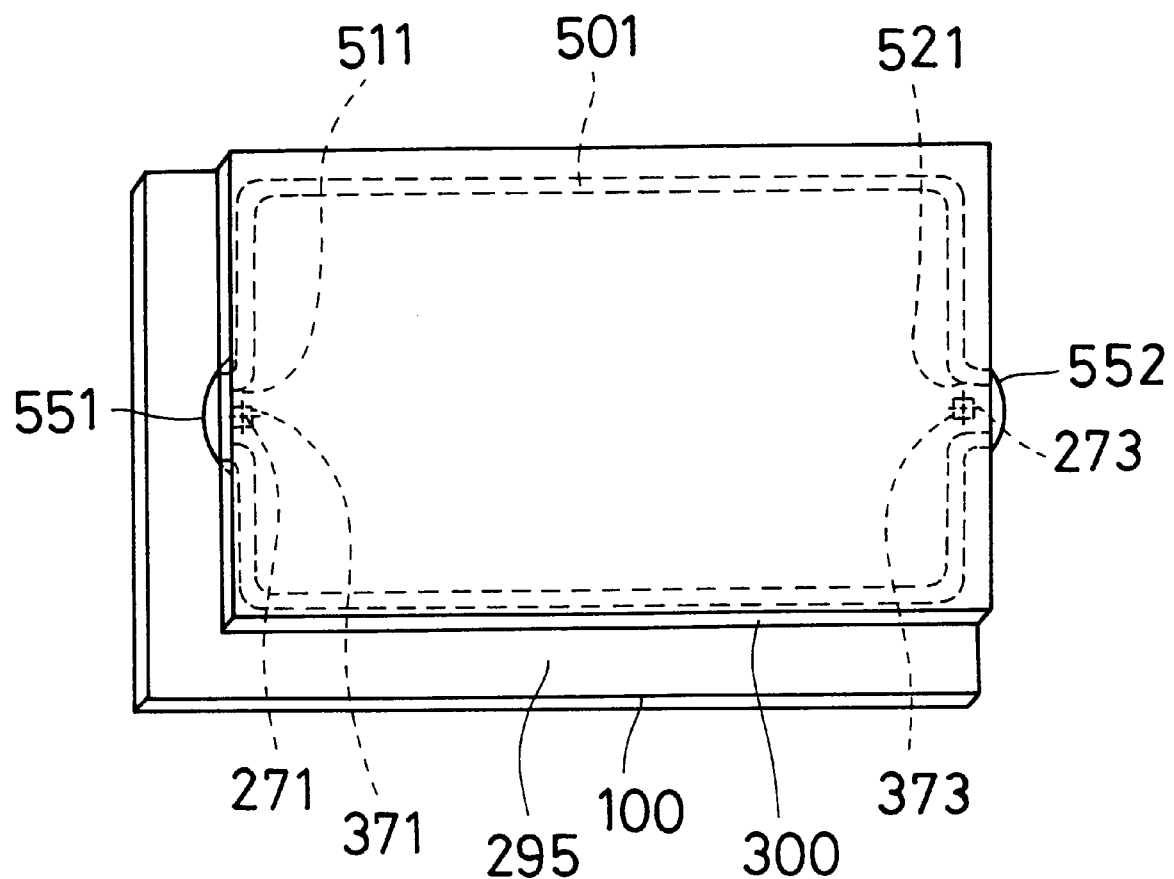
FIG. 7 is a schematic perspective view of other arrangement of alignment marks in accordance with the invention.

Another active matrix liquid crystal display device in accordance with the present invention is next described by referring to FIG. 7. This liquid crystal display device, generally indicated by reference numeral 2, is similar to the liquid crystal display device described already in connection with FIGS. 1–6 except that two holes 551 and 552 used in injecting the liquid crystal material 400 are located substantially in the centers of the two opposite shorter edges, respectively, and that the alignment marks 271, 273, 371, 373 are located on walls defining these holes 551 and 552 in the substrates 100 and 300.

In this embodiment, when the liquid crystal material 400 is injected into the empty cell after curing the sealant material 501, through one hole 552 the liquid crystal material 400 is injected while vacuum-pumping the other hole 551. With this method, the liquid crystal material can be injected in shorter period with greater ease than in the first-mentioned embodiment. Furthermore, the accuracy of the alignment can be improved further because the distance between the two sets of alignment marks 271, 273, 371, 373 is greater than in the first-mentioned embodiment.

Figure 8:
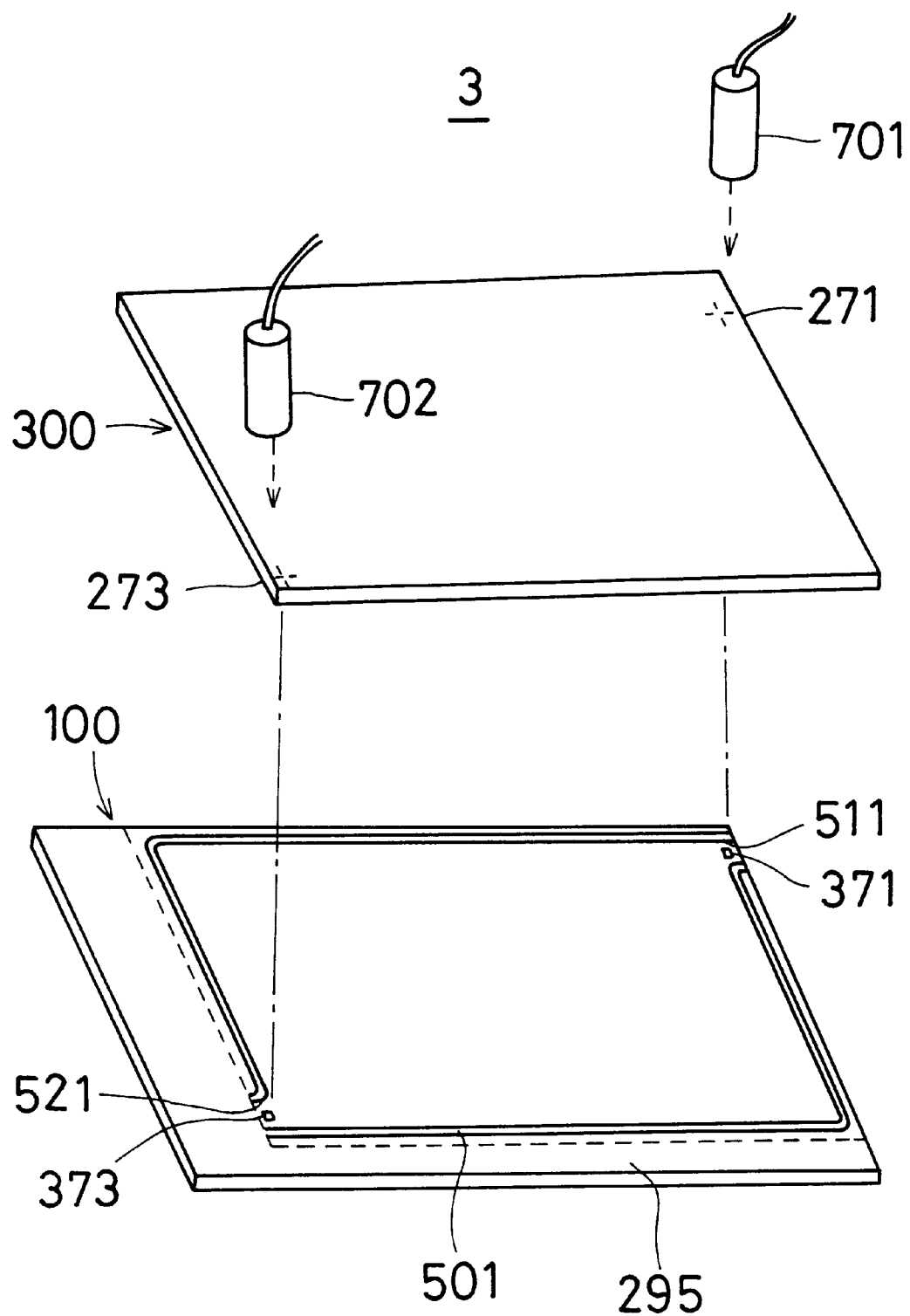
FIG. 8 is a schematic perspective view of further arrangement of alignment marks in accordance with the invention, showing an alignment operation.

Referring next to FIG. 8, there is shown a further liquid crystal display device in accordance with the present invention. This embodiment is similar to the embodiment described already in conjunction with FIG. 7 except that holes 511 and 521 are located in a diagonally opposite relation to each other in the liquid crystal display device, indicated by 3. The distance between the two sets of alignment marks 271, 273, 371, 373 is increased further. This further facilitates aligning both substrates 100 and 300.

Figure 9:
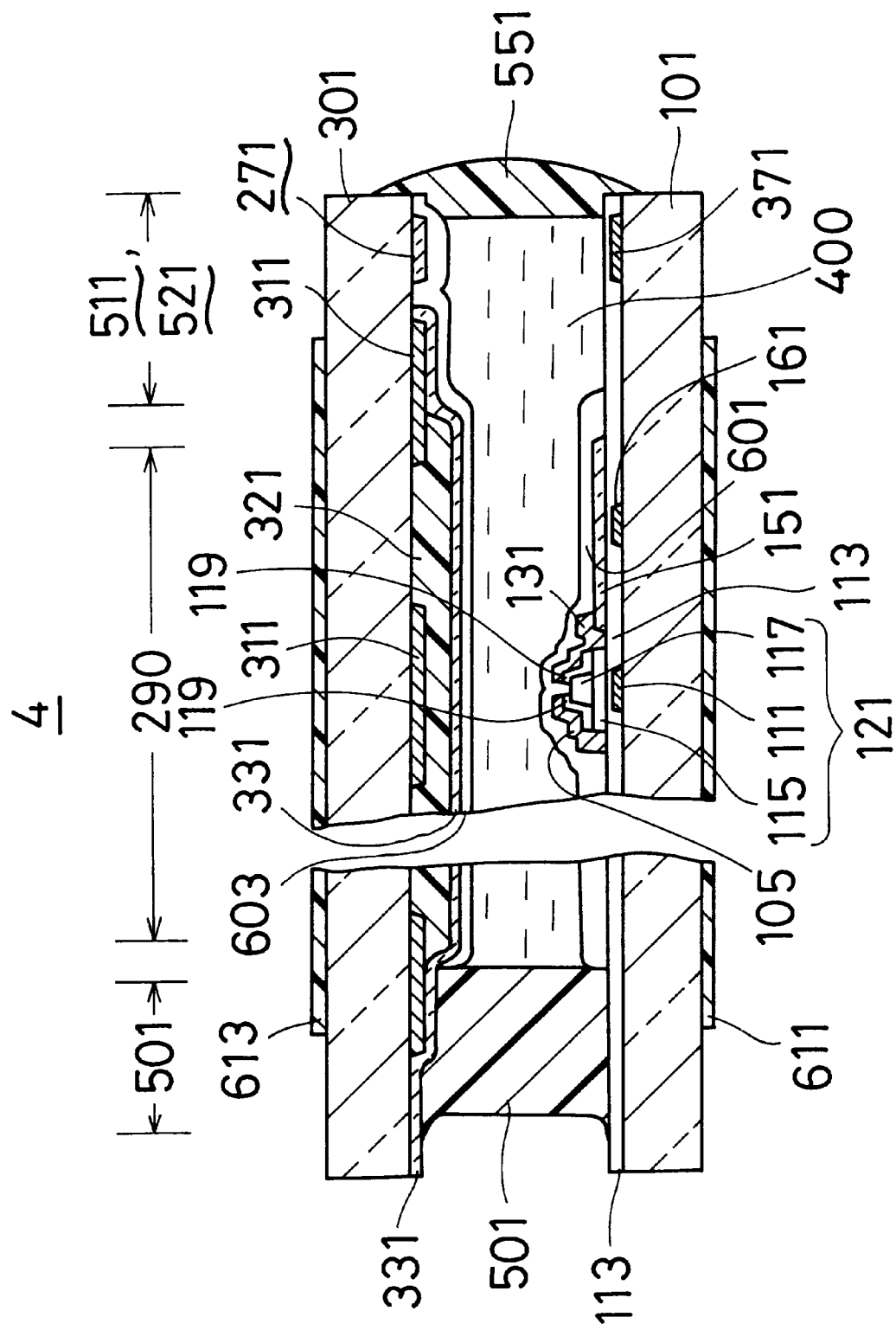
FIG. 9 is a vertical cross section similar to FIG. 3, but showing yet other arrangement of alignment marks in accordance with the invention.

Referring next to FIG. 9, there is shown a still other liquid crystal display device in accordance with the present invention. This liquid crystal display device, generally indicated by reference numeral 4, is similar in structure to the first-mentioned liquid crystal display device shown in FIGS. 1–6 except that the alignment mark 271 on the counter substrate consists of a layer of ITO. This layer of ITO and the counter electrode 331 are formed simultaneously, and then the ITO layer is patterned to form the alignment mark 271. Although regions located at the holes 511, 521 on the counter substrate 300 cannot be covered with the ITO layer, intrusion of unwanted impurities into the liquid crystal material 400 can be prevented by placing an orientation film 603 having sufficient thickness and reliability. In this embodiment, the sealant materials for closing off the injection holes can be entirely cured completely by UV irradiation. It is not necessary to perform additional heating for curing.

Figure 10:
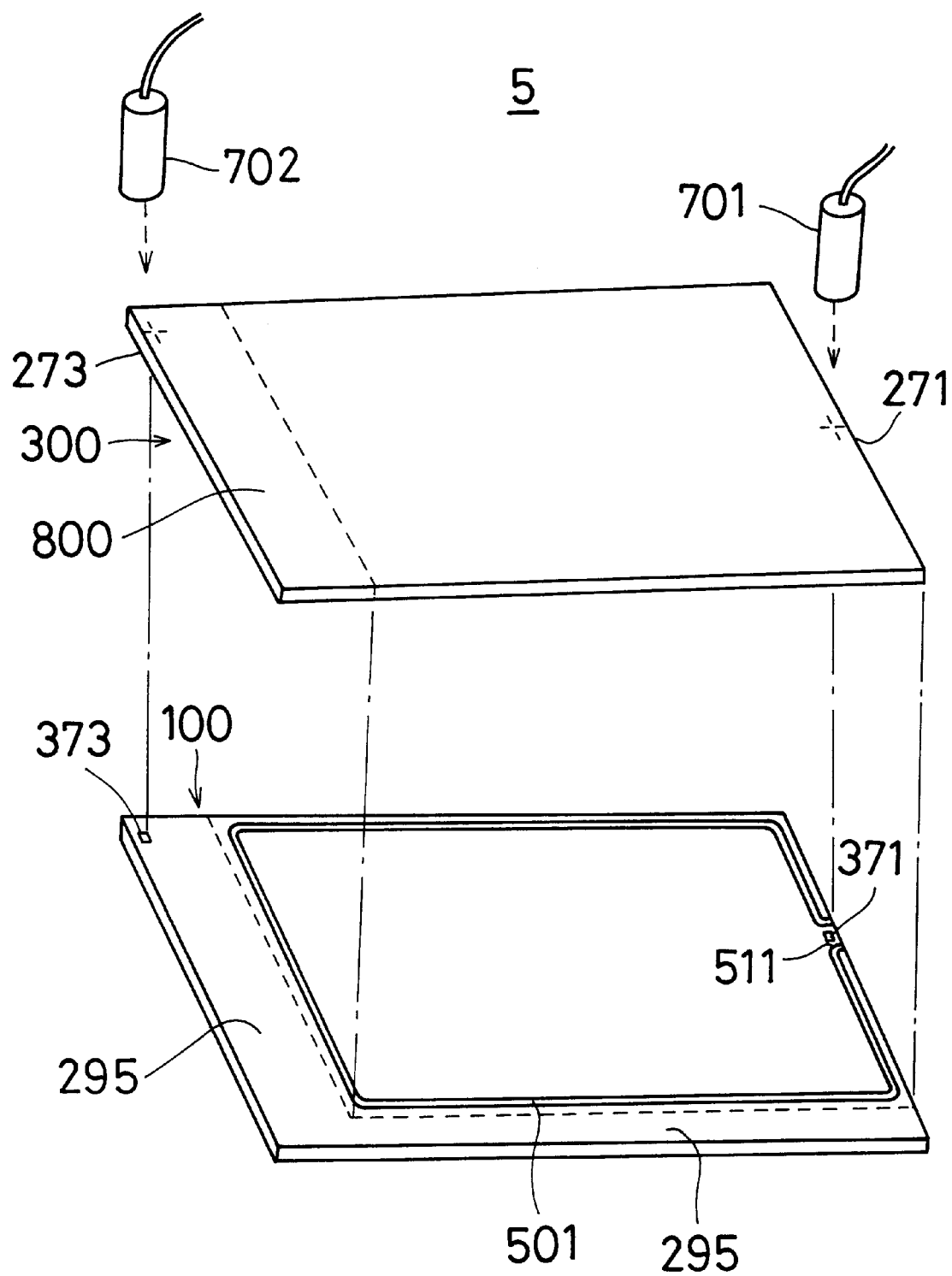
FIGS. 10 and 11 are schematic perspective views of a first modification of the active matrix liquid crystal display device shown in FIG. 1, showing the arrangement of alignment marks and alignment operations.

A first modification of the first-mentioned embodiment shown in FIGS. 1–6 is depicted in FIG. 10. This liquid crystal display device, generally indicated by reference numeral 5, is similar to the liquid crystal display device shown in FIGS. 1–6 except that only one hole 511 is formed around the center of one shorter side of the liquid crystal display device 5 and that one pair of alignment marks 271, 371 are formed in this hole 511. Of the other pair of alignment marks 273, 373, the mark 373 on the array substrate exists within a shelflike connector region 296 on the side of the scanning lines and is located farthest from the above-described alignment marks 271, 371 nested within the hole 511. The corresponding alignment mark 373 on the counter substrate is located outside the final contour of the counter substrate 300 and in a peripheral region 800 having the same dimensions as the shelflike connector region 296 on the array substrate 100. Accordingly, after both substrates 100 and 300 are bonded together, it is necessary to scribe and remove this peripheral region 800. However, the distance between the two sets of alignment marks 271, 273, 371, 373 can be made larger than in the prior art technique where alignment marks 1371 and 1373 are used only in the shelflike connector region 296 of the array substrate. Hence, the alignment can be made easily. With respect to the positions of the other set of alignment marks 271, 273 within a plane, relatively wide latitude is offered in setting these positions inside the range of the shelflike connector region 296 on the side of the scanning lines. Therefore, if the substrate size is modified within a given range, it is not necessary to change the positions of the two sets of alignment marks 271, 273, 371, 373. That is, if the substrate size is modified within the width of the shelflike connector region 296, the alignment step can be carried out without moving the positions of the cameras 701 and 702. Consequently, it is not necessary to vary the positions of the holes 511, 521 unlike the above-described embodiment.

Figure 11:
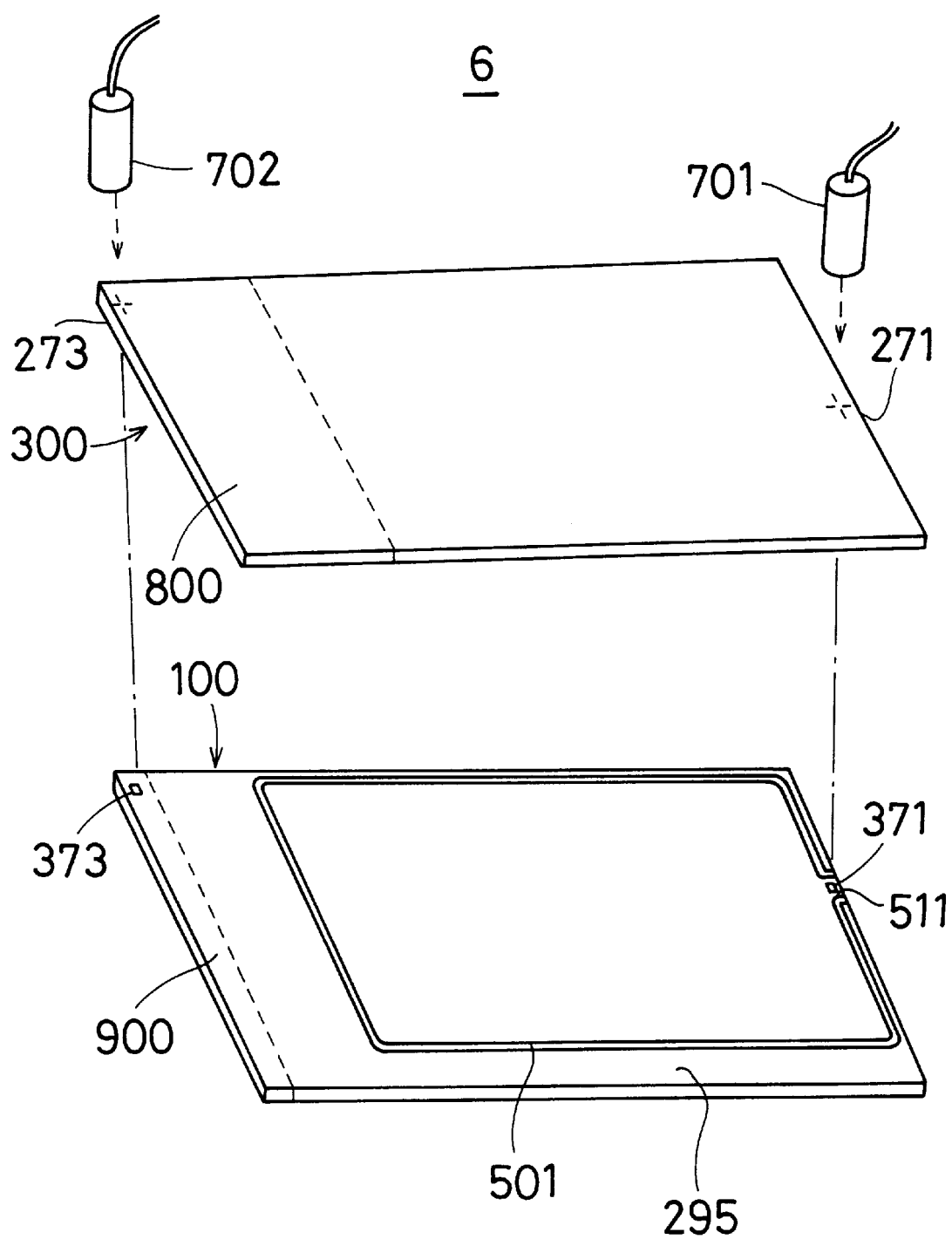
Figure 12:
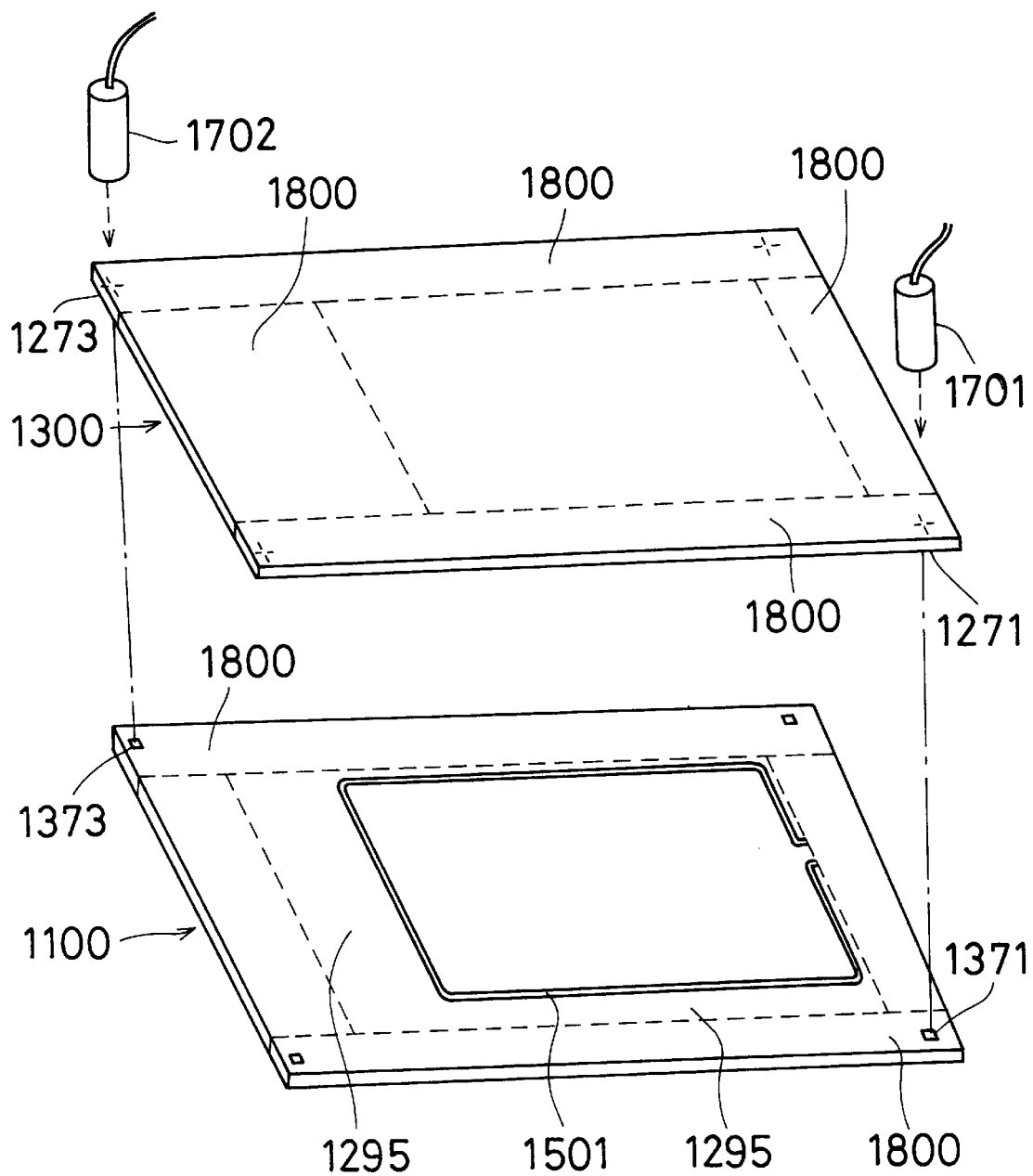
FIG. 12 is a schematic perspective view of a conventional active matrix liquid crystal display device, showing the arrangement of alignment marks and an alignment operation.
Figure 13:
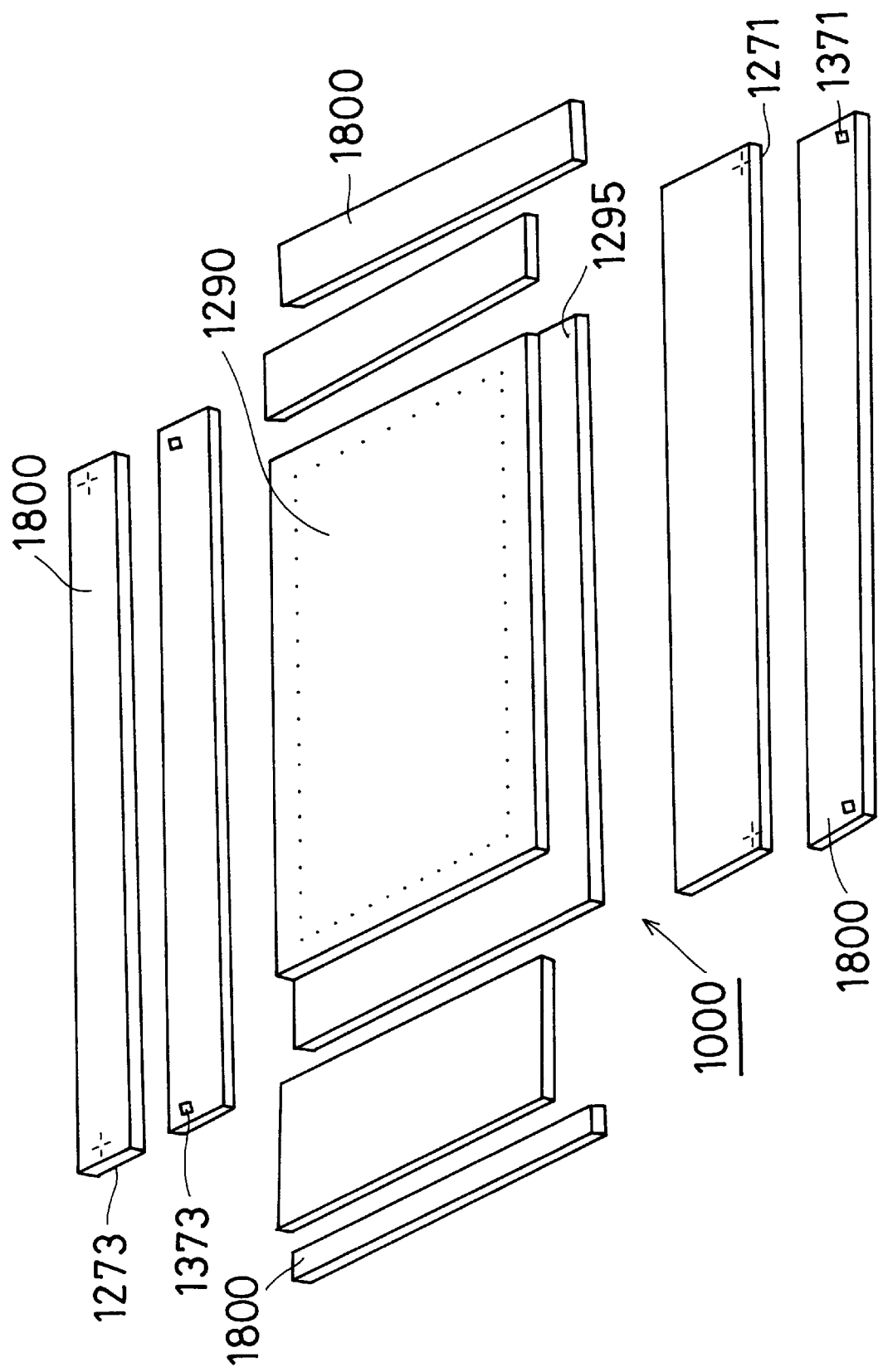
FIG. 13 is a schematic perspective view of the conventional liquid crystal display device shown in FIG. 12, illustrating removal of its peripheral region, using scribing.
Figure 14:
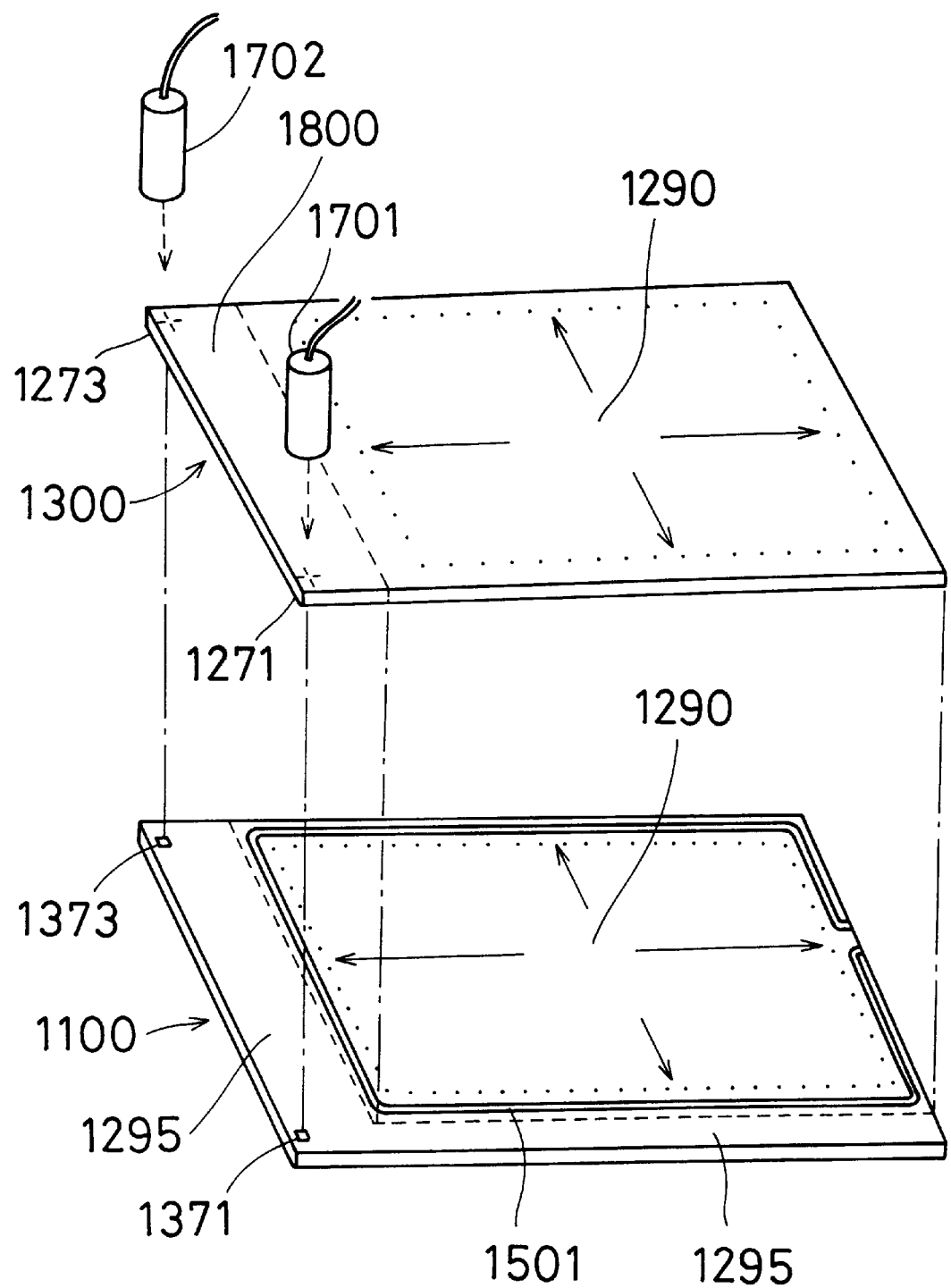
FIG. 14 is a schematic perspective view of another conventional active matrix liquid crystal display device, showing the arrangement of alignment marks and an alignment operation.

A second modification of the first-mentioned embodiment shown in FIGS. 1–6 is depicted in FIG. 11. This liquid crystal display device, generally indicated by reference numeral 6, is similar to the first modification except that the alignment marks 371, 373 of the other set are located in peripheral regions 800 and 900 that are outside the final contours of the substrates, whether the marks are positioned on the array substrate or on the counter substrate. Accordingly, after both substrates 100 and 300 are bonded together and the sealant materials are cured, the peripheral regions 800 and 900 must be scribed and removed from the substrates 100 and 300. However, where the alignment marks 271, 273, 371, 373 are located in a diagonally opposite relation to each other on the liquid crystal display device, the alignment step can be performed without varying the positions of the cameras 701 and 702 if the substrate size is modified, by holding constant the substrate size including the peripheral regions 800, 900 before the peripheral regions are scribed.

In these embodiments and modifications, an active matrix liquid crystal display device comprises switching devices of the inverted-staggered type. These switching devices consist of TFTs having a semiconductor device of a-Si:H film. It is to be noted that the invention is not limited to this structure. The semiconductor film may also be made of polycrystalline silicon. The switching devices may also be made of TFTs of the staggered type. The switching devices may also be MIM (metal-insulator-metal) devices.

What is claimed is:

1. A liquid crystal display device comprising:
    a first substrate having a plurality of display electrodes to form a display region;
    a second substrate disposed opposite to said first substrate having a gap therebetween;
    a liquid crystal material held in said gap;
    a sealing member interposed between the first and second substrate surrounding said display region and forming an opening region for injecting said liquid crystal material;
    and a pair of alignment marks disposed in the opening region on said first and second substrates, said a pair of alignment marks being used to align said first and second substrates with each other.

2. The liquid crystal display device of claim 1, wherein said sealing member comprises at least two opening regions, each having said a pair of alignment marks respectively.

3. The liquid crystal display device of claim 2, wherein said opening regions, each having said a pair of alignment marks respectively, are formed at one edge of said liquid crystal display device.

4. The liquid crystal display device of claim 2, wherein said opening regions, each having said a pair of alignment marks respectively, are formed at two opposite edges of said liquid crystal display device.

5. The liquid crystal display device of claim 2, wherein said opening regions, each having said a pair of alignment marks respectively, are formed at two diagonally opposite corners of said liquid crystal display device.

6. A method of fabricating a liquid crystal display device, comprising the steps of:
    preparing a first substrate having a plurality of display electrodes to form a display region;
    preparing a second substrate;
    disposing a sealing member on said first or second substrate to surround said display region and to form an opening regions for injecting a liquid crystal material;
    aligning and bonding said first and second substrates to each other via said sealing member, using a pair of alignment marks arranged in said opening region;
    and injecting said liquid crystal material into said gap.

7. The method of claim 6, wherein said disposing step includes to form at least two opening regions, each having a pair of alignment marks, located at each one of two opposite edges of said liquid crystal display device prior to said step of aligning and bonding said first and second substrates to each other, and wherein said injecting step is carried out by injecting said liquid crystal material from one of said opening regions while evacuating another opening region.

8. The method of claim 6, wherein said alignment marks and scanning lines upon said first substrate are formed from a common thin metal film by a common processing step.

9. The method of claim 6, wherein said alignment marks and a light-shielding film upon said second substrate are formed from a common material by a common processing step.

10. The method of claim 6, wherein said alignment marks and colored portions upon said second substrate are formed from a common material by a common processing step.

11. The method of claim 6, wherein said alignment marks and a counter electrode upon said second substrate are formed from a common material by a common processing step or said alignment marks and display electrodes upon said first substrate are formed from a common transparent material by a common processing step.

* * * * *